(12) United States Patent
Bansemir et al.

(10) Patent No.: US 6,429,786 B1
(45) Date of Patent: Aug. 6, 2002

(54) SENSOR AND EVALUATION SYSTEM, IN PARTICULAR FOR DOUBLE SENSORS FOR DETERMINING POSITIONS AND LIMIT VALUES

(75) Inventors: Werner Bansemir, Mannheim; Gerhard Jung, Bobenheim-Roxheim, both of (DE)

(73) Assignee: Pepperl + Fuchs GmbH, Mannheim (DE)

( * ) Notice: Subject to any disclaimer, the term of this patent is extended or adjusted under 35 U.S.C. 154(b) by 0 days.

(21) Appl. No.: 09/331,626
(22) PCT Filed: Dec. 19, 1997
(86) PCT No.: PCT/EP97/07181
§ 371 (c)(1), (2), (4) Date: Aug. 20, 1999
(87) PCT Pub. No.: WO98/28725
PCT Pub. Date: Jul. 2, 1998

(30) Foreign Application Priority Data

Dec. 20, 1996 (DE) .......................................... 196 53 291

(51) Int. Cl.[7] .................................................. H04Q 9/00
(52) U.S. Cl. .............................. 340/870.27; 340/870.11; 340/853.2
(58) Field of Search ....................... 340/870.27, 870.06, 340/870.11, 853.2

(56) References Cited

U.S. PATENT DOCUMENTS 3,587,076 A 6/1971 Grover
4,348,671 A 9/1982 Nussbaum

FOREIGN PATENT DOCUMENTS

GB 1504130 3/1978

OTHER PUBLICATIONS

Patents Abstracts of Japan vol. 8 No. 107(E–245), May 19, 1984 & JP 59 021193 A (Daizen Sougiyoukk), Feb. 3, 1984.

*Primary Examiner*—Timothy Edwards
(74) *Attorney, Agent, or Firm*—Horst M. Kasper

(57) ABSTRACT

The invention relates to a sensor and evaluation system for capturing data at a measuring station (3), in particular for use in double sensors for determining end positions and limit values. The individual sensors (1, 1', 2, 2', 16, 16') are operated as sensor pairs (1", 2", 16") by a largely shared control circuit consisting of two connecting lines (5, 6) with an electric current or voltage of alternate polarity. A state of a sensor (1, 1', 2, 2', 16, 16') is transmitted on the corresponding half-wave of the sensor current and evaluated by a switching amplifier (13) in relation to polarity and amplitude. Said sensor and evaluation system reduces the number of connecting lines required. In addition, interference from neighboring sensors is largely excluded, so that sensors can be mounted more closely together in a system. Said sensor and evaluation system is especially suited for equipment required to comply with the DIN 19234 (NAMUR) standard.

11 Claims, 4 Drawing Sheets

Figure 1:
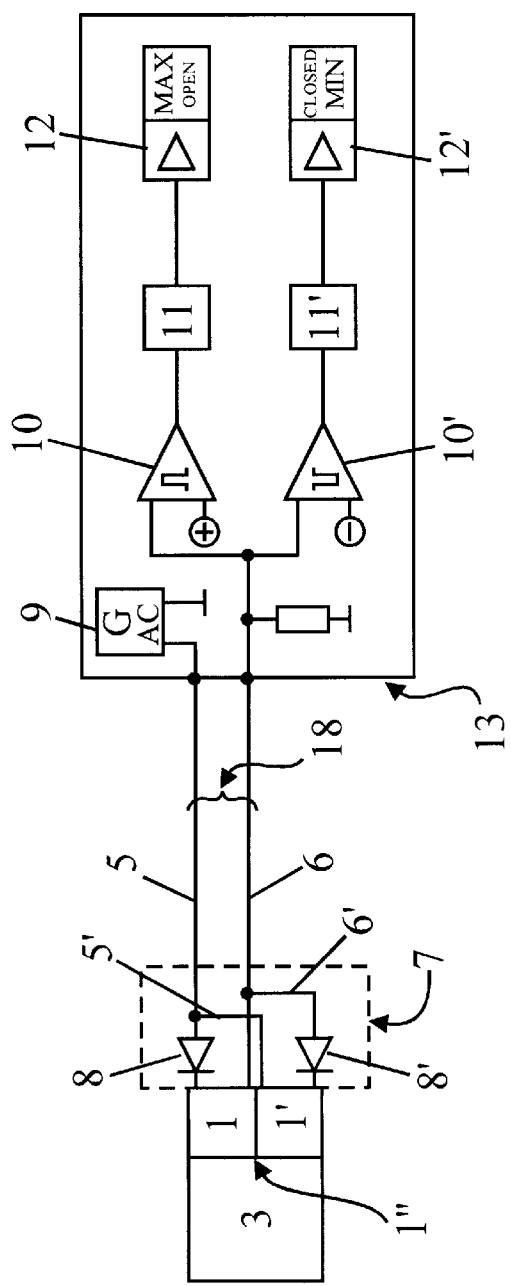

SENSOR AND EVALUATION SYSTEM, IN PARTICULAR FOR DOUBLE SENSORS FOR DETERMINING POSITIONS AND LIMIT VALUES

TECHNICAL AREA

The invention relates to a sensor and evaluation system for acquiring data at a measuring point, especially for double sensors for detecting final positions and limit values, consisting of at least two sensors that are connected via a control circuit to a remotely located switching amplifier with a current source or voltage source, whereby a connection wire leads from the current source or voltage source to the sensor and another connection wire leads from the sensor to an evaluation unit, and the sensor signal of each sensor normally consists of a change in the current flow as compared to the current flow in the quiescent state of the sensor and said sensor signal is transmitted via the control circuit to the switching amplifier in order to be evaluated there in an evaluation unit and to be output at an output stage in the form of signals (e.g. binary ZERO, ONE) as a function of the sensor and of the time, according to the generic part of claim 1.

STATE OF THE ART

Sensors are normally connected by two connection cables or by a two-core connecting line to a switching amplifier which supplies the sensors with direct current or direct voltage. The sensor signal consists in a change in the strength of the direct current flowing through the sensor to the evaluation unit as compared to the current flow in the quiescent state of the sensor. For example, an oscillator that is integrated into the sensor vibrates when the current circuit is closed and, in the quiescent state, i.e. without an object to be measured, it consumes a certain current, which is measured as the quiescent signal. If an object to be measured is brought closer to the active surface of the sensor, then the current consumption of the sensor changes, for example, as a result of eddy-current losses in the object to be measured, and thus the current flow in the evaluation unit also changes. The sensor signal is measured and amplified in the evaluation unit, and an output stage—depending on the signal level, e.g. when the value exceeds or falls below a certain switching threshold—generates a switching signal, e.g. binary "zero" or "one". The switching signal informs the user whether a certain state of the object to be measured is present, for instance, a certain spatial position or a certain pressure.

For many applications, it has to be determined whether the state of the object to be measured lies within certain tolerance limits. Therefore, in order to ascertain these two limit values, two sensors, i.e. a double sensor consisting of a sensor pair, with four connection wires are needed. This calls for quite complex wiring, which is disadvantageous for many applications. In particular in the realm of chemistry, electric lines should be reduced to a minimum. For this purpose, it is known to combine the two control circuits for double sensors on one side, thereby reducing the four connection wires to three. However, when work is done with inherently safe control circuits corresponding to DIN 19234 NAMUR), this has the drawback that the resultant sum current has to be taken into account in the verification of the inherent safety since, with NAMUR which provides that each of two sensors is a two-wire direct current sensor that operates at 8.2 V with switch points operating between 1.2 to 2.1 mA systems, failures such as line breaks or short circuits are checked via the current in the interface between the sensor and the switching amplifier.

Moreover, for numerous applications, more than two states of the object to be measured are to be detected with one system consisting of several sensors. Here as well, two connection wires per sensor or, if applicable, three per sensor pair constitutes quite complicated wiring and there is a need for subsequent electronic devices that are capable of receiving the connection cables and processing the corresponding signals. This is complex in terms of assembly and documentation, and entails potential sources of error.

Another disadvantage of the state of the art is that inductive sensors cannot be mounted at a location too close to a sensor system since they influence each other if they are in operation at the same time, thereby distorting the measured result.

DE 40 33 053 C1 describes a measured value acquisition and transmission device, consisting of a pick-up unit and a detection unit, which can be coupled together inductively for purposes of measured value transmission. The measured value acquisition and transmission device is supposed to prepare and transmit measured data in such a way that, first of all, environmental influences are eliminated to the greatest extent possible and secondly, the measured data can be transmitted interference-free and contact-free, even over long transmission distances. The elimination of environmental influences, for example, high temperatures, is achieved in that the pick-up unit—in addition to a measuring oscillator circuit—also comprises a reference circuit. The oscillation frequency of the measuring oscillator circuit changes primarily as a result of changes in the measured quantity to be monitored, for example, the pressure, but it is also influenced and distorted by environmental influences such as, for example, temperature changes. The reference circuit mimics the measuring oscillator circuit, but it is not capable of reacting to changes in the measured quantity. Its frequency changes only with the environmental influences. Therefore, interfering environmental influences should be eliminated by forming the quotient of the output signal of the measuring oscillator circuit and the output signal of the reference circuit. The quotient is formed in an electronic computing circuit.

The output signal of the electronic computing circuit is transmitted inductively from the pick-up unit to a detection unit. The computing circuit supplies a quasi digital signal that can be transmitted inductively without being very interference-prone. The information on the state of the object to be measured is contained in the frequency of this signal or in the number of counting pulses per unit of time.

TECHNICAL OBJECTIVE

The invention is based on the objective of creating a sensor and evaluation system of the type described above, in which the configuration of the individual sensors to form a system is simplified and the wiring effort between the sensors and the switching amplifier is reduced, and which allows an individual monitoring of the operating state of the individual sensor, a close spatial configuration of adjacent sensors without influencing each other and a compact design of the switching amplifier.

DISCLOSURE OF THE INVENTION AND ITS ADVANTAGES

With a sensor and evaluation system for acquiring data at a measuring point, especially for double sensors for detecting final positions and limit values, of the type described above, the achievement of the objective is characterized by the following features: a) two sensors—a sensor pair—are associated together with each of the two connection wires to form the control circuit; b) an alternating current or alternating voltage interface is associated with each sensor pair, and said interface is located in the vicinity of the sensors and is capable of transmitting positive signals to and from one sensor as well as negative signals to and from the other sensor of the sensor pair, whereby the two sensors of the sensor pair are connected together antiparallel and are always operated alternately with respect to each other; c) on the basis of the polarity of the signals, the switching amplifier establishes the association of the sensor signals of a sensor pair that are transmitted via the same connection wires to the sensor in question; d) the current source or voltage source is a current source or voltage source with an alternating polarity.

In another advantageous embodiment of the invention, in order to form the alternating current or alternating voltage interface of the connection wires that establish the connection to the switching amplifier, a short connection wire with a series-connected diode branches off in the vicinity of each of the sensors, whereby each sensor of the sensor pair is connected to two connection wires—one of them with a diode—having opposite polarity, i.e. the sensors of a sensor pair are connected together antiparallel.

The alternating current/voltage interface is set up with reverse-connect protection diodes that are already integrated into the sensor. Here, the sensors can be electronic sensors or mechanical contacts.

The connection wire leading to the switching amplifier is followed by at least one polarized comparator as an evaluation unit with a storage device and said comparator generates two static signals at the output stage, corresponding to the state of the sensors of the sensor pair.

The levels of the alternating current and the sensors correspond to DIN 19234 (NAMUR) and, for each sensor pair, the current is provided separately to the sensors for an evaluation of the signal for line breaks and line short circuits.

Moreover, the control circuit is galvanically separated from the current source or voltage source and from the evaluation unit and the subsequent elements.

The sensors are polarized analog transmitters and the evaluation units are polarized analog inputs or A/D transducers with storage behavior.

With the sensor and evaluation system according to the invention, in an advantageous manner, the connection wires necessary to connect the sensors to the switching amplifier are reduced from four, optionally three, wires per sensor pair to two per sensor pair. As a result, the wiring effort is reduced and the necessary connection points on the switching amplifier are reduced, as a result of which the latter can be designed more compactly.

With the sensor and evaluation system according to the invention, one sensor pair is actuated by a pair of wires with current having a polarity that alternates over time instead of with direct current. Current having a polarity that alternates over time is also designated as alternating current below, whereby alternating current in the most general sense of the term is to be understood. An alternating current/alternating voltage interface ensures that the individual sensor is supplied with current or voltage having a fixed polarity and that the two sensors of a sensor pair always operate alternately. One of the sensors of a sensor pair is actuated, for example, with the positive or negative half-wave of the alternating current, and the appertaining sensor signal consists of the amplitude of the positive or negative half-wave of the current transmitted to the evaluation unit, i.e. the information on the state of the individual sensor is contained in the amplitude of the particular half-wave of the signal transmitted by the shared control circuit. The evaluation unit associated with each individual sensor is only sensitive to signals of the specific polarity; signals of the opposite polarity are ignored or are evaluated by the evaluation unit that is associated with the other sensor of the sensor pair.

The evaluation unit can be a polarized comparator or a polarized analog input or an A/D transducer. By dispensing with a continuous direct current sensor signal, two pulsed signals can be transmitted via the same pair of lines by feeding in alternating current during the alternating operation of the sensors of a sensor pair. A stationary signal at the output stage is achieved in that the evaluation unit is followed by a storage device, for example, a peak-value hold device, a low-pass filter or a sample-and-hold unit.

In addition to the possibility of a more compact design of the switching amplifier, the cable savings also has the advantage that the entire sensor system can be wired with less effort and is thus easier to maintain and less error-prone.

The wiring according to the invention of two or more sensors to form a sensor system with reduced cabling can also be used when there are two sensors, one of which is used predominantly while the other is only used occasionally. Then, as the alternating current, a signal is used in which the positive and negative half-waves are of different lengths and which is optionally also switched manually.

The alternating current or alternating voltage interface in the area of the sensors can be formed simply in that, in the vicinity of each of the sensors, a short connection wire with a series-connected diode branches off from the connection wires that establish the connection to the switching amplifier, and then each sensor of the sensor pair is connected to two connection wires—one of them with a diode—having opposite polarity.

In many sensors, especially NAMUR sensors, diodes are already integrated as reverse-connect protection diodes, so that only a fixed input polarity is permissible. In this case, external diodes can be dispensed with when the alternating current interface is set up, and only one branching of the connection wires in the input area of the sensors is necessary in each case, whereby attention has to be paid to the antiparallel switching of the sensors.

The sensor and evaluation system according to the invention can be set up with any kind of sensors, mechanical or electric, analog or digital. The evaluation unit is adapted to the type of sensor (analog/digital operation). The sensor system according to the invention is especially advantageous for installations where inherent safety, e.g. according to DIN 19234 (NAMUR), is required such as, for example, level monitoring of tanks containing explosive liquids or pressure measurement or the detection of a valve state within such an installation. When the operating state of the individual sensor is monitored, for instance, checking for line breaks, the current flow through the appertaining control circuit is measured, whereby this flow must not fall below a certain limit.

In an advantageous manner, with the connection of the sensors according to the invention, the monitoring of the operating state can be carried out sensor-selectively since, with the positive or negative half-wave of the alternating current signal, there are practically two independent signals or pieces of information available.

In order to increase the operating safety of the sensor and evaluation system, it is advantageous for the control circuits to be galvanically separated from the current source or voltage source and from the evaluation units and subsequent elements, for example, with a transformer that, at the same time, transforms the mains voltage down to lower voltages in the range of a few volts, as required by NAMUR.

Since the sensors in the sensor and evaluation system according to the invention function at alternating times as a result of their operation with alternating current, there is less mutual influencing of electronic, e.g. inductive, sensors that are located close to each other than is the case with simultaneous continuous operation with direct current. If there are more than two sensors, the sensors can be connected together about twice as closely to form a sensor system than is the case with operation with direct current since, as a rule, only non-adjacent sensors are operated at the same time and could influence or interfere with each other; however, the individual sensor pairs are not at less distance with respect to each other than in the case of operation with direct current.

In principle, it is also possible for more than two sensors to be operated via a shared control circuit if there are synchronized sampling units before the sensor and in the switching amplifier, so that one sensor is switched on briefly at a given point in time but never at the same time as another sensor, and the analyzed sensor signal is associated with the appropriate output stage. Wiring just two sensors, however, is much less complicated since actuating the sensors and associating the signals can be achieved simply by means of the polarity, and the diodes needed to form the alternating current interface are often already integrated into the sensors.

Short description of the drawings in which the following is shown:

FIG. 1 a block diagram of a sensor and evaluation system with two sensors (for example, one double sensor)

Figure 2:
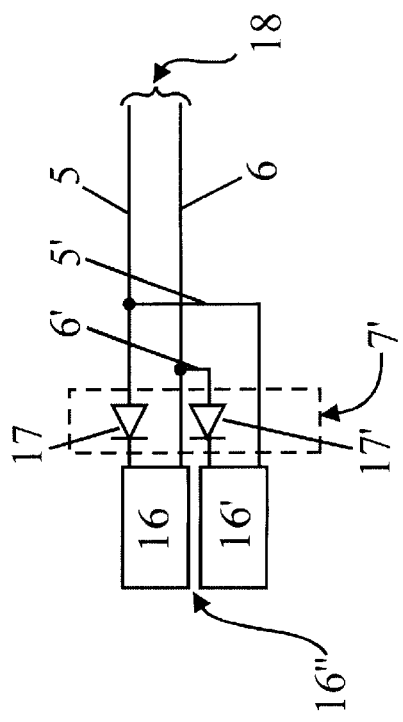
Figure 3:
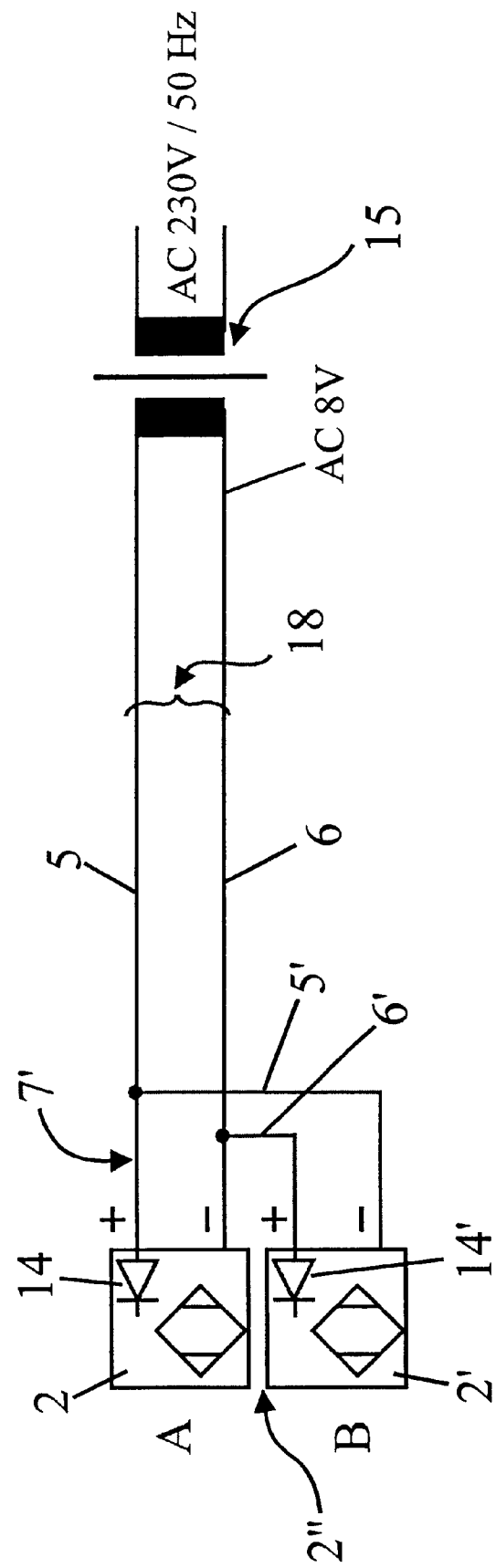
Figure 4:
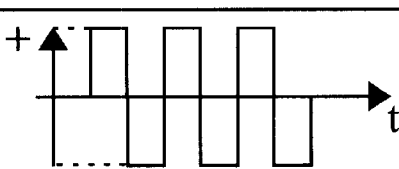

FIG. 2 a block diagram of part of a sensor and evaluation system with two sensors with an alternative structure of the alternating current interface FIG. 3 a block diagram of a part of a sensor and evaluation system with two sensors with reverse-connect protection diodes FIG. 4 a diagram for the representation of the sensor signals and the signals at the output of the switching amplifier as a function of the state of the sensors for one sensor pair.

Figure 5:
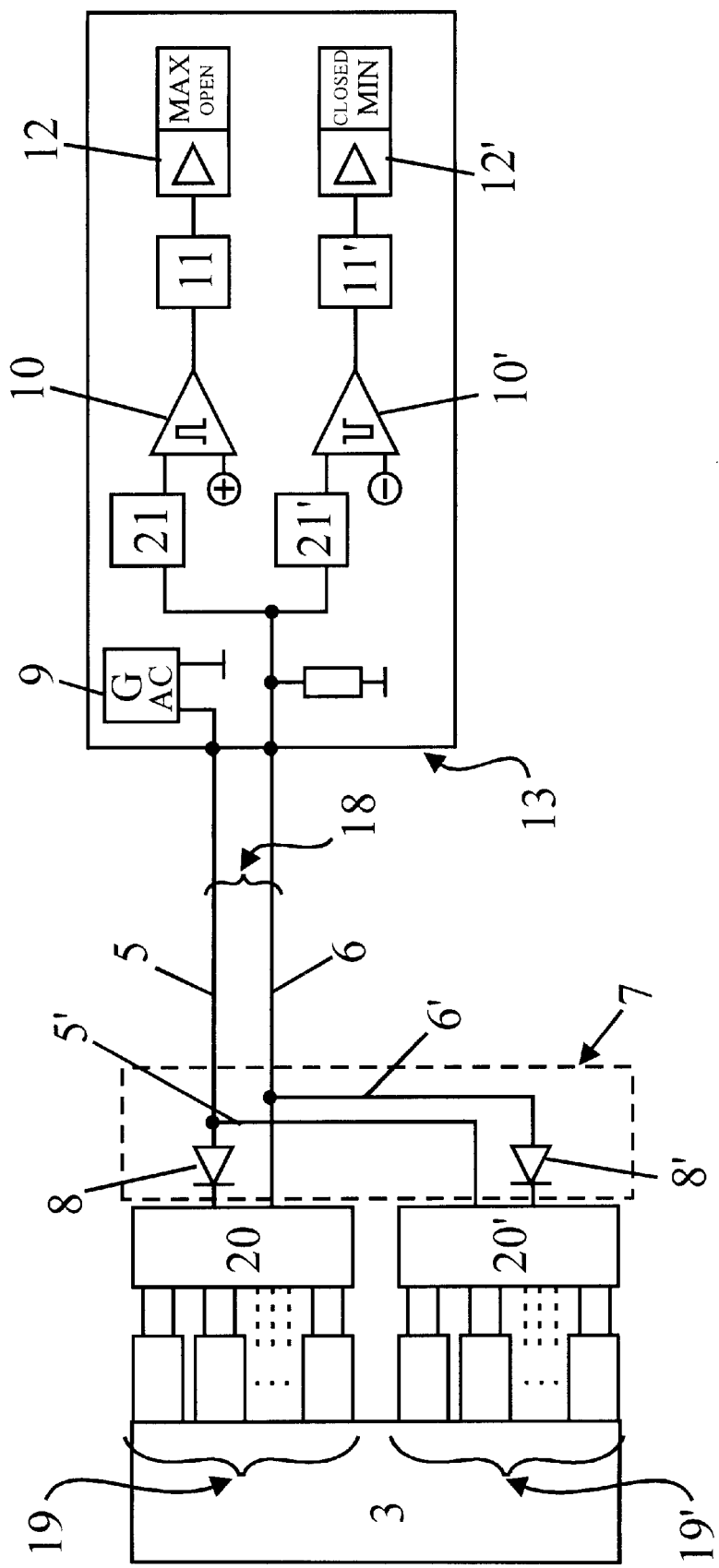

FIG. 5 a block diagram of a sensor and evaluation system with more then two sensors.

PREFERRED EMBODIMENTS OF THE INVENTION

FIG. 1 shows a block diagram of a sensor and evaluation system with two sensors 1 and 1' coupled to form a sensor pair 1", or a double sensor 1". The sensors 1, 1' serve for purposes of measured value acquisition at a measuring point 3, e.g. for detecting two end positions of an object to be measured that define a tolerance range, or for detecting a pressure or a valve position. The sensor pair is connected by two connection wires 5, 6 to a switching amplifier 13, which contains a source of alternating current 9 for supplying current to the sensor pair 1" as well as evaluation units 10, 10' and storage units 11, 11' and output stages 12, 12' for the evaluation and output of the sensor signal or of the information about the state of the sensor. The switching amplifier is, for example, a buffer amplifier.

For the most part, the two connection wires 5 and 6 are associated with the sensors 1 and 1' of the sensor pair 1" and form a largely shared control circuit 18. The connection of the sensor pair 1" with the switching amplifier 13 is thus achieved with just two connection wires 5, 6, which can be very long, since the sensor 1, 1' is generally located far away from the switching amplifier 13. All of the other electronic connections are short lines.

Since sensors are generally operated with direct current or direct voltage, in the vicinity of the sensors, there is an alternating current/voltage interface 7 for rectifying the alternating current or the alternating voltage and said interface transmits the positive half-wave of the alternating current/voltage from and to sensor 1 or else the negative half-wave of the alternating current/voltage from and to sensor 1'. The alternating current/voltage interface is formed in that short connection wires 5' and 6' branch off from the connection wires 5 and 6, whereby the sensor 1 is connected to the wires 5 and 6, while the sensor 1' is connected to the wires 5' and 6', and there is a series-connected diode 8' or 8 between the branching site and the sensor input at each of the wires 5 and 6'. The polarity of the wires and the switching of the diodes (blocking/conducting direction) is selected in such a way that the two sensors 1, 1' of the sensor pair are connected antiparallel, they react to signals of fixed, different polarity and thus, when alternating current is fed in, they are operated alternately, i.e. pulsed with the alternating current frequency.

An example of the signal course is shown in FIG. 1 and described in the text below. The sensor 1 is actuated by the control circuit 18 consisting of the connection wires 5 and 6, and the sensor 2 is actuated by the control circuit 18 consisting of the connection wires 5 and 6, which are continued after the branching, and by the connection wires 5' and 6'. Via the connection wire 6, the alternating current signal generated by the current source 9 and modified by the sensors 1, 1', depending on the state of the object to be measured in terms of the positive and/or negative amplitude, is transmitted to the evaluation units 10, 10', whereby the evaluation unit 10 is associated with the sensor 1 and is sensitive to positive signals, while the evaluation unit 10' is associated with the sensor 1' and is sensitive to negative signals. The evaluation unit then generates a signal if the positive or negative amplitude of the sensor signal lies above or below an adjustable threshold. A polarized comparator or a polarized analog input or an A/D transducer, for example, can be used as the evaluation unit. It is also possible to use a shared evaluation unit per sensor pair, if this unit is able to separate positive and negative signals from each other and it generates two output signals at the output stage which are then associated with the individual sensors.

Since the sensor signal of the individual sensor and thus also the signal generated by the evaluation unit 10, 10' is pulsed, but since a stationary signal is desired at the output stage 12, 12', the evaluation unit and the output stage have storage elements 11, 11' between them, for example, a peak-value hold device, a low-pass filter or a sample-and-hold unit. Thus, a signal, e.g. valve open or closed, can be generated at the output stage that is stationary on the time scale of the alternating current, but that can depict changes on the time scale of the processes that occur at the measuring site.

With the schematic set-up shown, however, it is also possible to operate predominantly one of the sensors of the sensor pair with direct current and only to occasionally change the polarity of the current and thus to actuate and select the second sensor. This should also be understood in the broad sense as referring to the operation of the sensor and evaluation system with current having an alternating polarity.

It is easy to form a sensor and evaluation system with a plurality of sensors (19, 19') by always connecting the individual sensors together pairwise as shown in FIG. 5. This makes it possible to set up a sensor system in which a mutual influencing of immediate neighbors can be largely ruled out by synchronized sampling units (20, 20', 21, 21') since directly adjacent sensors are not operated at the same time and thus, for instance, any inductive coupling remains without consequences.

FIG. 2 shows a block diagram of part of a sensor and evaluation system consisting of two sensors 16, 16' that can also be a double sensor. The levels of the alternating current and the sensors (1, 1', 2, 2', 16, 16') can correspond to DIN 19234 (NAMUR). The current can be provided separately to the sensors (1, 1', 2, 2') for each sensor pair (1", 2" 16"), for an evaluation of the signal for line breaks and line short circuits. The sensors (1, 1', 2, 2', 16, 16') can be polarized analog transmitters and the evaluation units (10, 10') can be polarized analog inputs or A/D transducers with storage behavior. The alternating current interface 7 is set up in such a way that it is preceded by two diodes 17, 17' on inputs of the sensors 16, 16' that correspond to each other, for example, the signal input, and antiparallel coupling to the long connection wires 5, 6 with short connection wires 5', 6'. The two diodes can already be integrated into an eight-pole component so that the user merely has to couple the connection wires and the sensors with the component in such a way that the sensors are connected antiparallel. The continuation of the sensor and evaluation system along the long connection wires 5, 6 corresponds to the set-up shown in FIG. 1.

FIG. 3 shows a block diagram of a part of a sensor and evaluation system with a sensor pair 2" or with a double sensor consisting of two sensors 2, 2', whereby the sensors 2, 2' are fitted with reverse-connect protection diodes 14, 14' according to DIN 19234 (NAMUR). Since the diodes needed to set up an alternating current interface 7 are already integrated into the sensors 2, 2' as reverse-connect protection diodes 14, 14', here at the plus input, the antiparallel actuation of the sensors 2, 2' can be effectuated with current having a fixed polarity in that the plus input of sensor 2 is connected in parallel with the minus input of sensor 2' by means of connection wires 5, 5', and the minus input of sensor 2 is connected in parallel with the plus input of sensor 2' by means of connection wires 6, 6' without the involvement of additional diodes. The connection of the sensor pair 2" with the switching amplifier, which is not shown here, is established by two long connection wires 5, 6. The short connection wires 5', 6' serve only for the parallel connection of the sensors 2, 2'.

A transformer 15 galvanically separates the control circuit 18 (connection wires 5, 5', 6, 6') and the sensors 2, 2' from the power supply and the evaluation units as well as the subsequent elements. The transformer transforms the mains voltage to voltages in the range of a few volts so that the current flows—at a few mA—in the control circuit 18 lie within the limits permitted by NAMUR.

FIG. 4 shows a diagram for the representation of the sensor signals and the signals at the output of the switching amplifier as a function of the state of the sensors A, B of a sensor pair connected according to the invention, e.g. sensors 2, 2' shown in FIG. 2. In the top line, the voltage present at the switching amplifier is shown as a function of the time t. This is square-wave voltage that brings about a current flow with a square course over time in the control circuit 18.

In the first column, the states of sensors A, B or of the sensor pair are shown schematically, whereby a bar in front of the sensor is intended to indicate that the switching threshold of the sensor has been exceeded and the object to be measured is in a previously defined state that is to be ascertained.

The second column shows the sensor current, the current through the control circuit, as a function of the time with the same time axis as the voltage shown in the first line.

In the last column, the output of the switching amplifier is shown in the form of binary signals, zero and one, or as an equation that is not to be understood in the strictly mathematical sense. The numeral one means that the sensor is in the quiescent state, whereas a zero means that another, previously defined state has occurred (indicated by the bar in front of the sensor). The information A or B relates to the specific sensor A or B and thus to the state whose occurrence is to be monitored with the sensor A or B.

The third and fourth lines show how the signals of two sensors A or B behave in the connection according to the invention at an alternating current interface, but without the connection of the other sensor of the sensor pair in the quiescent state (no bar). Due to the alternating voltage, only the positive or negative current component can flow through sensor A or B ($3^{rd}$ or $4^{th}$ line) as sensor current. In the quiescent state of the sensor, the current strength has an amplitude $\hat{I}$ or $-\hat{I}$. The signal at the output of the switching amplifier is one in both cases, corresponding to the quiescent state of the sensor or the "normal state" of the object to be measured.

The fifth and sixth lines show how the signals of two sensors A and B behave in the connection according to the invention at an alternating current interface, but without the connection of the other sensor of the sensor pair in the previously defined state of the object to be measured (bar) at which the sensor switches. Due to the alternating voltage, only the positive or negative current component can flow through sensor A or B ($5^{th}$ or $6^{th}$ line) as sensor current. In the switched state of the sensor, the current strength has an amplitude $\hat{I}$ or $-\hat{I}$, which is less than the amount of the amplitude $\hat{I}$ in the quiescent state. If the amount of the amplitude of the sensor current lies below a threshold, then zero is signaled at the output. This is the case in the $5^{th}$ and $6^{th}$ lines, so that the signal at the output of the switching amplifier is zero in both cases, which indicates the previously defined state of the object to be measured.

The seventh to tenth lines show how the signals of two sensors A and B behave in the connection according to the invention at an alternating current interface and combination to form a sensor system as shown in FIGS. 1 or 2.

In the $7^{th}$ line, both sensors A and B are in the quiescent state (no bar), the amount of the positive as well as of the negative amplitude is $\hat{I}$. The time course of the sensor current follows the voltage that is present at the switching amplifier. Since the positive and negative half-waves are each evaluated on their own and since their amplitude lies above the switching threshold, the stationary signal one is generated simultaneously in each case at the output for the sensor A and the sensor B.

In the $8^{th}$ line, both sensors A and B are in the switching state (with bar), the amount of the positive as well as of the negative amplitude is I. In this case, the time course of the sensor current also follows the voltage that is present at the switching amplifier, but with a reduced amplitude I, which lies below the switching threshold. The stationary signal zero is generated simultaneously in each case at the output for the sensor A and the sensor B.

In the 9$^{th}$ line, the sensors A are in the switched state (with bar) and the sensor B is in the quiescent state (no bar). The positive and negative half-waves of the sensor current have different amplitudes Î or –Î. Thus, the amount of the amplitude of the sensor current lies below the switching threshold for sensor A and above the switching threshold for sensor B. At the output, the stationary signal zero is generated for the sensor A and, at the same time, the stationary signal one is generated for the sensor B. The situation in the 10$^{th}$ line results from the situation described here by reversing the sensors A and B as well as the mathematical signs of the sensor signals.

All in all, it is evident that two sensors of a sensor pair can always be operated alternately to each other by feeding in alternating current through a shared control circuit and nevertheless, the same information about the state of the sensor and thus the state of the object to be measured can be transmitted with the same shared control circuit.

Commercial Utilization

The subject matter of the invention is suitable especially for use in installations where inherent safety, e.g. according to DIN 19234 (NAMUR), is required such as, for example, level monitoring of tanks containing explosive liquids or pressure measurement or the detection of a valve state within such an installation. When the operating state of the individual sensor is monitored, for instance, checking for line breaks, the current flow through the appertaining control circuit is measured, whereby this flow must not fall below a certain limit. The usefulness of the invention consists especially in the fact that the sensor and evaluation system according to the invention can be set up with any kind of sensors, mechanical or electric, analog or digital. The evaluation unit is adapted to the type of sensor (analog/digital operation). Advantageously, the monitoring of the operating state can be carried out sensor-selectively since, with the positive and negative half-wave of the alternating current signal, there are practically two independent signals or pieces of information available.

| List of the reference numerals: | |
|---|---|
| 1,1',2,2',16,16',19,19' | sensor |
| 1",2",16" | sensor pair |
| 3 | measuring point |
| 5,5',6,6' | connection wire |
| 7,7' | alternating current or alternating voltage interface |
| 8,8',14,14',17,17' | diode (14,14' reverse-connect protection diode) |
| 9 | current source or voltage source |
| 10,10' | evaluation unit |
| 11,11' | storage element |
| 12,12' | output stage |
| 13 | switching amplifier |
| 15 | transformer |
| 18 | control circuit |
| 20,20',21,21' | synchronized sampling unit |

What is claimed is:

1. Sensor and evaluation system for acquiring data at a measuring point (3), especially for double sensors for detecting final positions and limit values, consisting of at least two sensors (1,1',2,2',16,16') that are connected via a control circuit to a remotely located switching amplifier (13) with a current source or voltage source (9), whereby a connection wire (5,5') leads from the current source or voltage source to the sensor (1,1',2,2',16,16') and another connection wire (6,6') leads from the sensor (1,1',2,2',16,16') to an evaluation unit (10,10'), and the sensor signal of each sensor (1,1',2,2', 16,16') normally consists of a change in the current flow as compared to the current flow in the quiescent state of the sensor (1,1',2,2',16,16') and said sensor signal is transmitted via the control circuit to the switching amplifier (13) in order to be evaluated there in an evaluation unit (10,10') and to be output at an output stage (12,12') in the form of signals (e.g. binary ZERO, ONE) as a function of the sensor (1,1',2,2', 16,16') and of the time, characterized by the following features:

a) two sensors (1,1',2,2',16,16')—a sensor pair (1", 2"16")—are associated together with each of the two connection wires (5,5',6,6') to form the control circuit;

b) an alternating current or alternating voltage interface (7,7') is associated with each sensor pair (1",2"16"), and said interface (7,7') is located in the vicinity of the sensors (1,1',2,2',16,16') and is capable of transmitting positive signals to and from one sensor (1,2,16) as well as negative signals to and from the other sensor (1',2', 16') of the sensor pair (1",2"16"), whereby the two sensors (1,1',2,2',16,16') of the sensor pair (1",2"16") are connected together antiparallel and are always operated alternately with respect to each other;

c) on the basis of the polarity of the signals, the switching amplifier (13) establishes the association of the sensor signals of a sensor pair (1",2"16") that are transmitted via the same connection wires (5,5',6,6') to the sensor (1,1',2,2',16,16') in question;

d) the current source or voltage source (9) is a current source or voltage source with an alternating polarity.

2. Sensor and evaluation system according to claim 1, characterized in that in order to form the alternating current or alternating voltage interface (7,7') of the connection wires (5,6) that establish the connection to the switching amplifier, a short connection wire (5',6') with a series-connected diode (8,8',14,14',17,17') branches off in the vicinity of each of the sensors (1,1',2,2',16,16'), whereby each sensor (1,1',2,2',16, 16') of the sensor pair (1",2"16") is connected to two connection wires (5,5',6,6')—one of them with a diode (8,8',14,14',17,17')—having opposite polarity, i.e. the sensors of a sensor pair (1",2"16") are connected together antiparallel.

3. Sensor and evaluation system according to claim 1, characterized in that the alternating current/voltage interface (7) is set up with reverse-connect protection diodes (14,14') that are already integrated into the sensor (1,1',2,2').

4. Sensor and evaluation system according to claim 1, characterized in that the sensors (1, 1',2,2', 16,16') are electronic sensors or mechanical contacts.

5. Sensor and evaluation system according to claim 1, characterized in that the connection wire (6) leading to the switching amplifier (13) is followed by at least one polarized comparator as an evaluation unit (10,10') with a storage device (11,11') and said comparator generates two static signals at the output stage (12,12'), corresponding to the state of the sensors (1,1',2,2',16,16') of the sensor pair (1',2"16").

6. Sensor and evaluation system according to claim 1, characterized in that for each sensor pair (1",2"16"), the current is provided separately to the sensors (1,1',2,2') for an evaluation of the signal for line breaks and line short circuits.

7. Sensor and evaluation system according to claim 1, characterized in that the control circuit is galvanically separated from the current source or voltage source (9) and from the evaluation unit (10,10') and the subsequent elements (11,11',12,12').

8. Sensor and evaluation system according to claim 1, characterized in that the sensors (1,1',2,2',16,16') are polarized analog transmitters and the evaluation units (10,10') are polarized analog inputs or A/D transducers with storage behavior.

9. Sensor and evaluation system according to claim 1, characterized in that more than two sensors (19, 19') are operated via a shared control circuit (18), whereby there are synchronized sampling units (20, 20', 21, 21') before the sensor and in the switching amplifier, so that one sensor is switched on briefly at a given point in time but never at the same time as another sensor, and the analyzed sensor signal is associated with the appropriate output stage.

10. Sensor and evaluation system for acquiring data at a measuring point (3), especially for double sensors for detecting final positions and limit values, consisting of at least two sensors (1,1',2,2',16,16') that are connected via a control circuit to a remotely located switching amplifier (13) with a current source or voltage source (9), whereby a connection wire (5,5') leads from the current source or voltage source to the sensor (1,1',2,2',16,16') and another connection wire (6,6') leads from the sensor (1,1',2,2',16,16') to an evaluation unit (10,10'), and the sensor signal of each sensor (1,1',2,2', 16,16') normally consists of a change in the current flow as compared to the current flow in the quiescent state of the sensor (1,1',2,2',16,16') and said sensor signal is transmitted via the control circuit to the switching amplifier (13) in order to be evaluated there in an evaluation unit (10,10') and to be output at an output stage (12,12') in the form of signals (e.g. binary ZERO, ONE) as a function of the sensor (1,1',2,2', 16,16') and of the time, characterized by the following features:
- a) two sensors (1,1',2,2',16,16')—a sensor pair (1", 2"16")—are associated together with each of the two connection wires (5,5',6,6') to form the control circuit;
- b) an alternating current or alternating voltage interface (7,7') is associated with each sensor pair (1",2"16"), and said interface (7,7') is located in the vicinity of the sensors (1,1',2,2',16,16') and is capable of transmitting positive signals to and from one sensor (1,2,16) as well as negative signals to and from the other sensor (1',2', 16') of the sensor pair (1",2"16"), whereby the two sensors (1,1',2,2',16,16') of the sensor pair (1",2"16") are connected together antiparallel and are always operated alternately with respect to each other;
- c) on the basis of the polarity of the signals, the switching amplifier (13) establishes the association of the sensor signals of a sensor pair (1",2"16") that are transmitted via the same connection wires (5,5',6,6') to the sensor (1,1',2,2',16,16') in question;
- d) the current source or voltage source (9) is a current source or voltage source with an alternating polarity, wherein more than two sensors are operated via a shared control circuit, whereby there are synchronized sampling units before the sensor and in the switching amplifier, so that one sensor is switched on briefly at a given point in time but never at the same time as another sensor, and the analyzed sensor signal is associated with the appropriate output stage.

11. A sensor and evaluation system for acquiring data at a measuring point (3) comprising
- a current source or voltage source (9);
- a remotely located switching amplifier (13) connected to the current source or voltage source (9);
- a first sensor (1,1',2,2',16,16') connected through the control circuit to the remotely located switching amplifier (13) connected to the current source or voltage source (9);
- a second sensor (1,1',2,2',16,16') connected through the control circuit to the remotely located switching amplifier (13) connected to the current source or voltage source (9);
- a first connection wire (5,5') leading from the current source or voltage source (9) to the first sensor (1,1',2, 2',16,16');
- an evaluation unit (10, 10');
- an output stage (12,12');
- a second connection wire (6,6') leading from the second sensor (1,1',2,2',16,16') to the evaluation unit (10,10'), wherein the first sensor, the second sensor, the first connection wire and the second connection wire form a control circuit, and wherein a sensor signal of the second sensor (1,1',2,2',16,16') normally consists of a change in a current flow as compared to a quiet current flow in a quiescent state of the sensor (1,1',2,2',16,16') and wherein said sensor signal is transmitted via the control circuit to the switching amplifier (13) in order to be evaluated in the evaluation unit (10,10') and to be output at an output stage (12,12') in the form of signals (e.g. binary ZERO, ONE) as a function of the second sensor (1,1',2,2',16,16') and of the time, wherein the first sensor and the second sensor form a sensor pair (1",2"16") and are associated together with each of the first connection wire and of the second connection wire (5,5',6,6') to form a control circuit;
- an alternating current or alternating voltage interface (7,7') associated with the sensor pair (1",2"16"), and wherein said interface (7,7') is located in the vicinity of the first sensor and of the second sensor (1,1',2,2',16, 16') and wherein said interface (7,7') is capable of transmitting positive signals to and from the first sensor (1,2,16) as well as negative signals to and from the second sensor (1',2',16') of the sensor pair (1", 2" 16"), whereby the first sensor and the second sensor (1,1',2, 2',16,16') of the sensor pair (1",2"16") are connected together antiparallel and are always operated alternately with respect to each other;
- wherein the switching amplifier (13) establishes the association of the sensor signals of a sensor pair (1",2"16") that are transmitted via the same connection wires (5,5',6,6') to the sensor (1,1',2,2',16,16') in question on the basis of the polarity of the signals;
- wherein the current source or voltage source (9) is a current source or voltage source with an alternating polarity.

* * * * *